United States Patent
Joshi et al.

(10) Patent No.: US 10,599,419 B2
(45) Date of Patent: Mar. 24, 2020

(54) SECURE FIRMWARE UPDATES USING VIRTUAL MACHINES TO VALIDATE FIRMWARE PACKAGES

(71) Applicant: Dell Products L. P., Round Rock, TX (US)

(72) Inventors: Anand P. Joshi, Round Rock, TX (US); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/970,178

(22) Filed: May 3, 2018

(65) Prior Publication Data

US 2019/0339958 A1    Nov. 7, 2019

(51) Int. Cl.
*G06F 8/65* (2018.01)
*G06F 9/455* (2018.01)
(Continued)

(52) U.S. Cl.
CPC .................. *G06F 8/65* (2013.01); *G06F 8/61* (2013.01); *G06F 9/4406* (2013.01);
(Continued)

(58) Field of Classification Search
CPC . G06F 8/61; G06F 8/65; G06F 9/4406; G06F 9/45558; G06F 11/1433;
(Continued)

(56) References Cited

U.S. PATENT DOCUMENTS

| 7,356,679 B1* | 4/2008 | Le et al. ............ G06F 9/45558 717/176 |
| 2008/0133208 A1* | 6/2008 | Stringham .......... G06F 11/0793 717/171 |

(Continued)

OTHER PUBLICATIONS

Yao, Jiewen, and Vincent J. Zimmer; Intel Corporation; "White Paper—A Tour Beyond BIOS Launching a VMM in EFI Developer Kit II"; https://firmware.intel.com/sites/default/files/A_Tour_Beyond_BIOS_Launching_VMM_in_EFI_Developer_Kit_II_0.pdf; Sep. 2015; pp. 1-25.

*Primary Examiner* — Wei Y Zhen
*Assistant Examiner* — Mohammed N Huda
(74) *Attorney, Agent, or Firm* — Campbell Stephenson LLP; Shiv S. Naimpally

(57) ABSTRACT

Provided herein are systems, methods, and computer program products for testing a firmware update in a secure virtual environment prior to actually installing the firmware update in a device or system. In one embodiment, a firmware update is received. The system is rebooted after receiving the firmware update, and a virtual machine monitor (VMM) is launched following the reboot. In turn, the VMM registers various exit handlers and policies, and launches a virtual machine within a unified extensible firmware interface (UEFI) stored within a reprogrammable read only memory. The process uses the VMM to launch a virtual machine, which is used to perform a test installation of the firmware update. If no violations or other errors are detected in connection with the test installation, the process reboots the system again and installs the firmware update in the regular operating environment following the reboot.

20 Claims, 5 Drawing Sheets

(51) Int. Cl.
*G06F 11/14* (2006.01)
*G06F 9/4401* (2018.01)
*G06F 8/61* (2018.01)

(52) U.S. Cl.
CPC ...... *G06F 9/45558* (2013.01); *G06F 11/1433* (2013.01); *G06F 2009/45562* (2013.01)

(58) Field of Classification Search
CPC . G06F 8/63; G06F 8/654; G06F 8/656; G06F 8/658; G06F 9/4408; G06F 9/4416; G06F 9/442; G06F 11/0712; G06F 11/1417; G06F 11/1438; G06F 11/1441
USPC ....................................................... 717/169
See application file for complete search history.

(56) References Cited

U.S. PATENT DOCUMENTS

2016/0117165 A1* 4/2016 Cavalaris et al. ........ G06F 8/65
717/169
2018/0165101 A1* 6/2018 Bulusu et al. .......... G06F 8/656

* cited by examiner

SECURE FIRMWARE UPDATES USING VIRTUAL MACHINES TO VALIDATE FIRMWARE PACKAGES

BACKGROUND OF THE INVENTION

Field of the Invention

This invention generally relates to performing secure firmware updates, and more specifically to using virtual machines to validate firmware update packages prior to actually installing the firmware update.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many vulnerabilities can be introduced to a system during firmware updates. For instance, vulnerabilities may be introduced to the system if the firmware package has unknown bugs or other deficiencies or errors in the code. Although technology currently exists to ensure that the firmware update package is authentic, such technology cannot presently be used to determine whether the code itself is sound and free of bugs, errors, and other vulnerabilities. This functionality is important because some vulnerabilities can be so severe as to cause permanent system failures, whereas other vulnerabilities may expose the system to future nefarious actors (e.g., hackers) and malicious code (e.g., viruses and malware).

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In one embodiment, a firmware update is received. The system is rebooted after receiving the firmware update, and a virtual machine monitor (VMM) is launched following the reboot. The VMM registers various exit handlers and policies, such as those listed elsewhere in this disclosure. The VMM also launches a virtual machine within a unified extensible firmware interface (UEFI), which can be stored in a reprogrammable non-volatile memory, such as a flash memory or a reprogrammable read only memory, among other possibilities. The method uses the VMM to launch a virtual machine in the UEFI, and that virtual machine is used to perform a test installation of the firmware update. If any violations or other errors are detected, the method attempts to resolve those violations and/or errors. If no violations or other errors are detected in connection with the test installation, or if all detected violations and other errors are able to be resolved, the method reboots the system again and installs the firmware update in the regular environment following the reboot. Functionality such as that which was summarized above allows the system to test the firmware update in a secure virtual environment prior to actually installing the firmware update in the regular environment, thereby preventing any bugs, errors, vulnerabilities, and so forth, from finding their way into the actual operating environment as a result of the firmware update.

The foregoing is a summary and thus contains, by necessity, simplifications, generalizations and omissions of detail, consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The embodiments of the present application may be better understood, and its numerous objects, features, and advantages made apparent to those skilled in the art by referencing the accompanying drawings. In the figures, the left-most digit(s) of a reference number identifies the figure in which the reference number first appears. The same reference numbers in different figures indicate similar or identical items.

Figure 1:
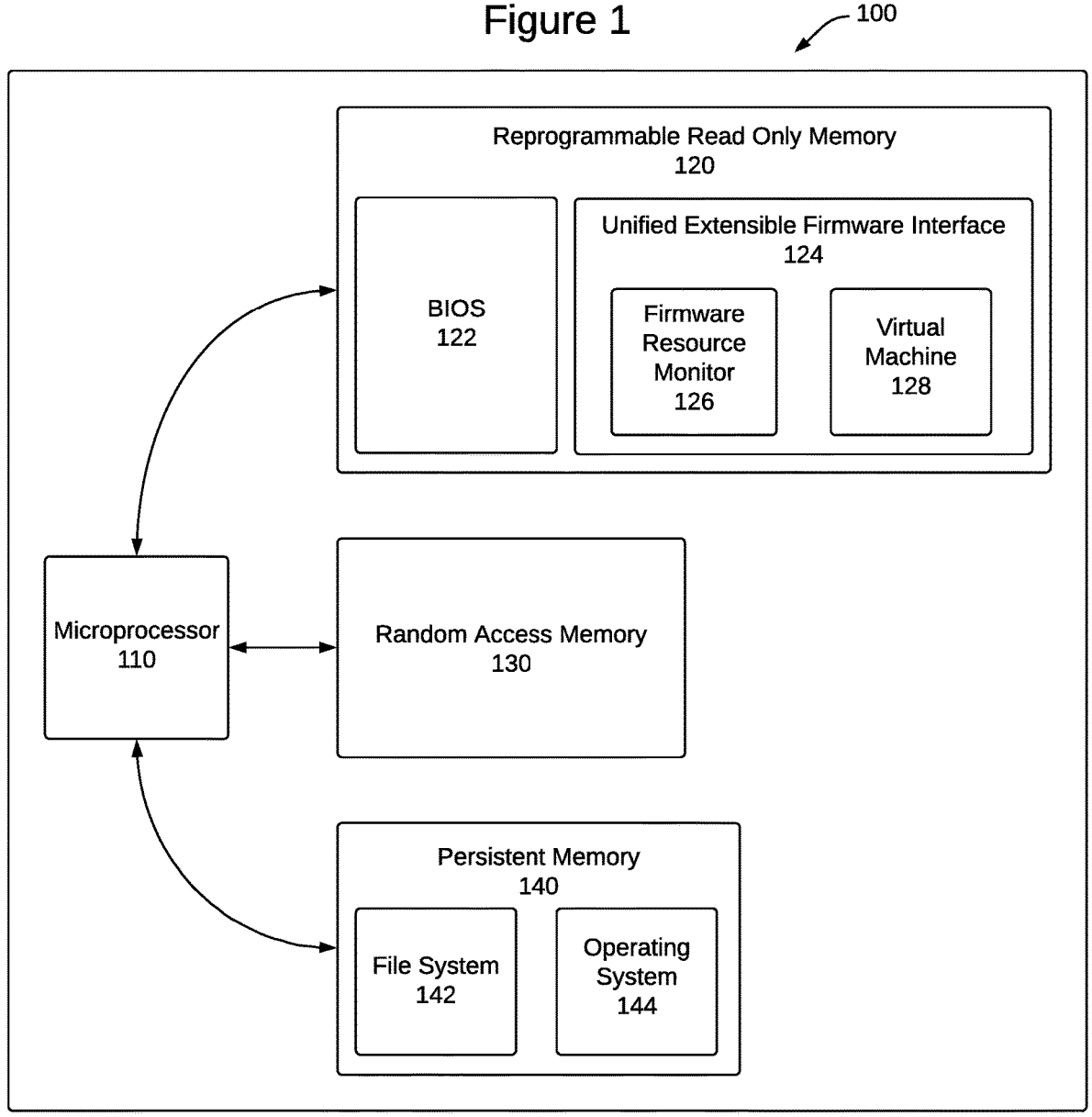
FIG. 1 is a block diagram depicting an example computing environment, according to one embodiment of this disclosure.

While the embodiments of the present disclosure are susceptible to various modifications and alternative forms, specific embodiments are provided as examples in the drawings and detailed description. It should be understood that the drawings and detailed description are not intended to limit the embodiments to the particular form disclosed. Instead, the disclosure is intended to cover all modifications, equivalents and alternatives falling within the spirit and scope of the disclosure as defined by the appended claims.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Many vulnerabilities can be introduced during firmware updates. Such vulnerabilities may arise, for example, if the firmware update package includes any bugs or coding errors, or if the firmware update includes malware or a virus. If the firmware that includes any such vulnerabilities is installed before those vulnerabilities are removed or otherwise corrected, those vulnerabilities can cause numerous errors when the firmware is executed. Such errors can include, for example, system failures, or even permanent and irreversible damage to a system, potentially even rendering the entire machine useless.

As such, this disclosure provides methods, computer program products, computer systems, and the like, for performing a test installation of a firmware update in a secure virtual environment prior to installing the firmware update outside the virtual environment. The test installation may be performed as part of the firmware installation process. Further details will be provided below in conjunction with the discussion of the various figures included herewith. Further details are provided below in conjunction with the discussion of the various Figures included with this disclosure.

FIG. 1 shows a computing system 100, which can be any type of computing system as described herein. As some common examples, computing system 100 can be a laptop computer, desktop computer, tablet computer, or a mobile device such as a smartphone. Computing system 100 can also be an auxiliary device, such as a printer, scanner, card reader, networking device (such as a switch, router, and so forth), or various devices that include embedded microcontrollers, among many other examples.

Computing system 100 includes various components, such as a microprocessor 110, a reprogrammable read only memory (ROM) 120, a random access memory (RAM) 130, and persistent memory 140. Microprocessor 110 can be any type of microprocessor, and can include one or more cores. Reprogrammable read only memory 120 can be any form of read only memory, including, e.g., NAND flash memory, other forms of flash memory, read only memory (ROM), and/or electrically erasable programmable read only memory (EEPROM). RAM 130 can be any form of random access memory and can be used as system memory. Persistent memory 140 can be a hard disk drive, flash drive, or solid state hard drive, among other available forms of persistent memory. Persistent memory may also be referred to in this disclosure, or the in claims associated with this disclosure, as a non-transient computer-readable storage medium, as "on-disk" memory, or by a similar term. Unlike RAM 130, both reprogrammable read only memory 120 and persistent memory 140 generally retain their data stored thereon during a system shutdown, power loss, or similar event.

Figure 5:
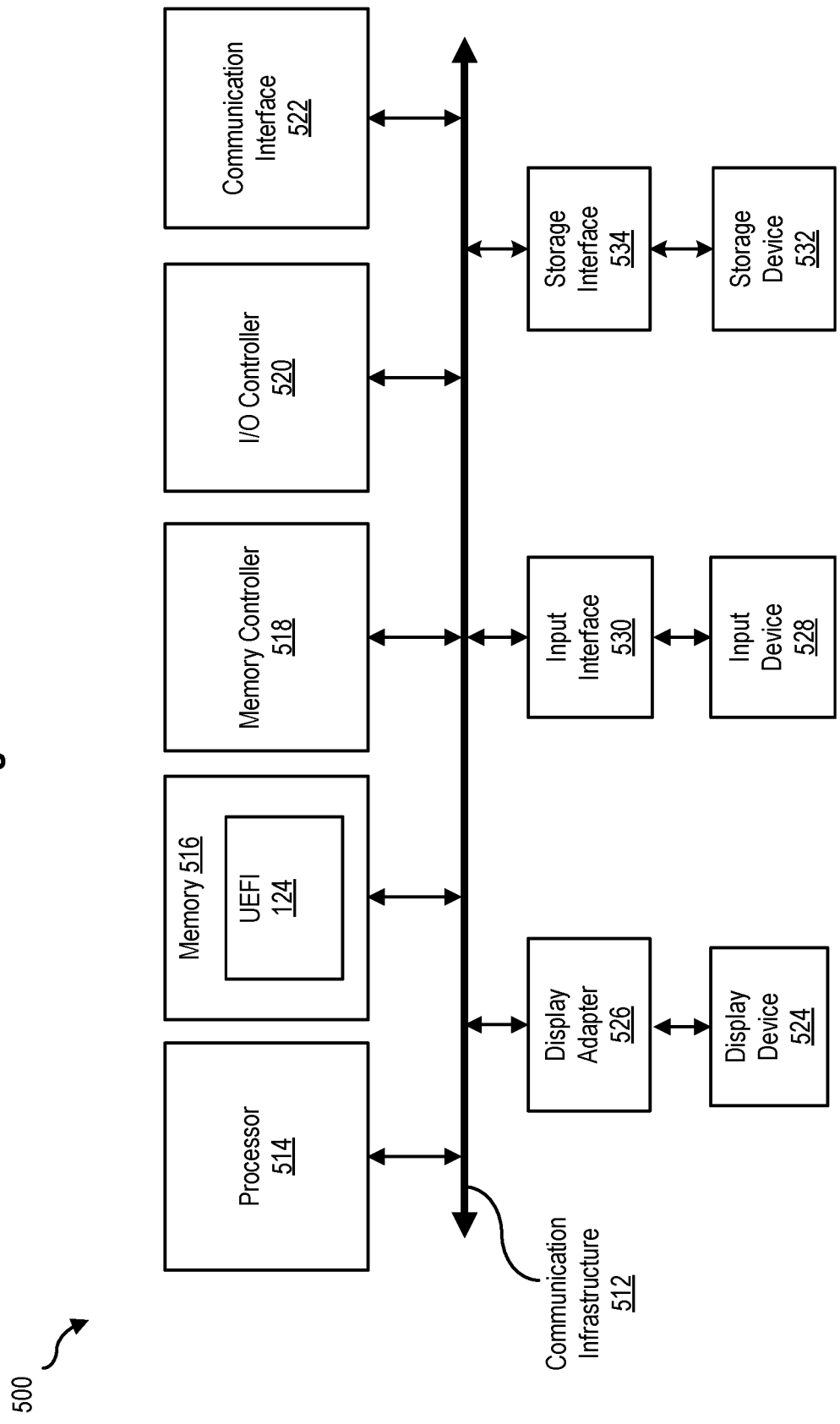
FIG. 5 is a block diagram of a computing device, illustrating how certain features of the instant disclosure can be implemented, according to one embodiment of the present disclosure.

As can be seen from FIG. 1, reprogrammable read only memory 120, RAM 130, and persistent memory 140 are all communicatively coupled to microprocessor 110. For purposes of this disclosure, the specific architecture connecting these components is irrelevant, so long as each of reprogrammable read only memory 120, RAM 130, and persistent memory 140 can communicate either directly or indirectly with microprocessor 110. Moreover, while certain components of system 100 are highlighted for the sake of the discussion and disclosure provided herein, in practice system 100 will typically contain additional components as is needed for proper functionality of a computing device, for example, as is shown in FIG. 5. Of course, the specific components included in any system or computing device can vary quite considerably from system to system and from computing device to computing device.

As can also be seen in FIG. 1, reprogrammable read only memory 120 includes a firmware component, such as a basic input/output system (BIOS) 122. Although the BIOS 122 is used as an example of firmware throughout the discussion provided herein, in practice, the systems and methods provided herein can be used in conjunction with a different firmware component other than a BIOS. For instance, other examples of firmware include device drivers and microcontrollers.

FIG. 1 also shows a unified extensible firmware interface (UEFI) 124. In one embodiment, the UEFI serves as an interface between the BIOS (or other firmware components) and the computing system's regular operating system (e.g., operating system 144). In other embodiments, other interfaces between the BIOS (or other firmware) and the regular operating system can be used. The UEFI can be used to run system diagnostics, such as might be related to the BIOS (or other firmware), including diagnostics that might be related to an update to the BIOS (or other firmware). Moreover, because the UEFI can provide this functionality without an operating system being mounted or otherwise installed (or prior to booting the system to the regular operating system), the use of a UEFI allows for the testing and installation functionality as described herein. In one embodiment, UEFI 124 can be used to execute a virtual machine monitor (VMM), also known as a hypervisor. A VMM can include software and/or other components that creates and runs virtual machines. In the specific embodiment shown in FIG. 1, the VMM is shown as a firmware resource monitor, and specifically as firmware resource monitor 126. A firmware resource monitor, such as firmware resource monitor 126, is a lightweight VMM. By virtue of being lightweight, firmware resource monitor 126 reduces the amount of resources that are needed to launch and monitor a virtual machine, such as virtual machine 128. In particular, a lightweight VMM can be configured to include only functionality that is absolutely necessary to the performance of a specific function or functions. Moreover, a lightweight VMM does not require the use of an operating system. Virtual machine 128 can be any type of virtual machine, as long as it is capable of executing one or more aspects of the functionality described and claimed herein.

Finally, persistent memory 140 is depicted in FIG. 1 as includes a file system 142 and an operating system 144. The file system can be any file system, such as, e.g., FAT32, exFAT, NTFS, APFS, HFS+, EXT2, EXT3, EXT4, and VERITAS FILE SYSTEM (VxFS), among other possibilities. The operating system can be any operating system, including desktop operating systems (e.g., MICROSOFT WINDOWS and MAC OS), a mobile operating system (e.g., APPLE iOS, GOOGLE ANDROID, and MICROSOFT WINDOWS PHONE OS), as well as various other specialized operating systems, such as might be used, e.g., in a printer, scanner, microcontroller-embedded device, or other such devices, such as those listed herein, among other examples.

The aforementioned elements of computing system 100 were included in FIG. 1, and discussed in this disclosure, because of their applicability to the rest of this disclosure. Of course, computing system 100 can, and generally will, include various other components and functionality, such as are common to computing systems and/or are needed thereby for the operation thereof. As will be appreciated, FIG. 1 is not intended to be limiting in any regard.

Figure 2:
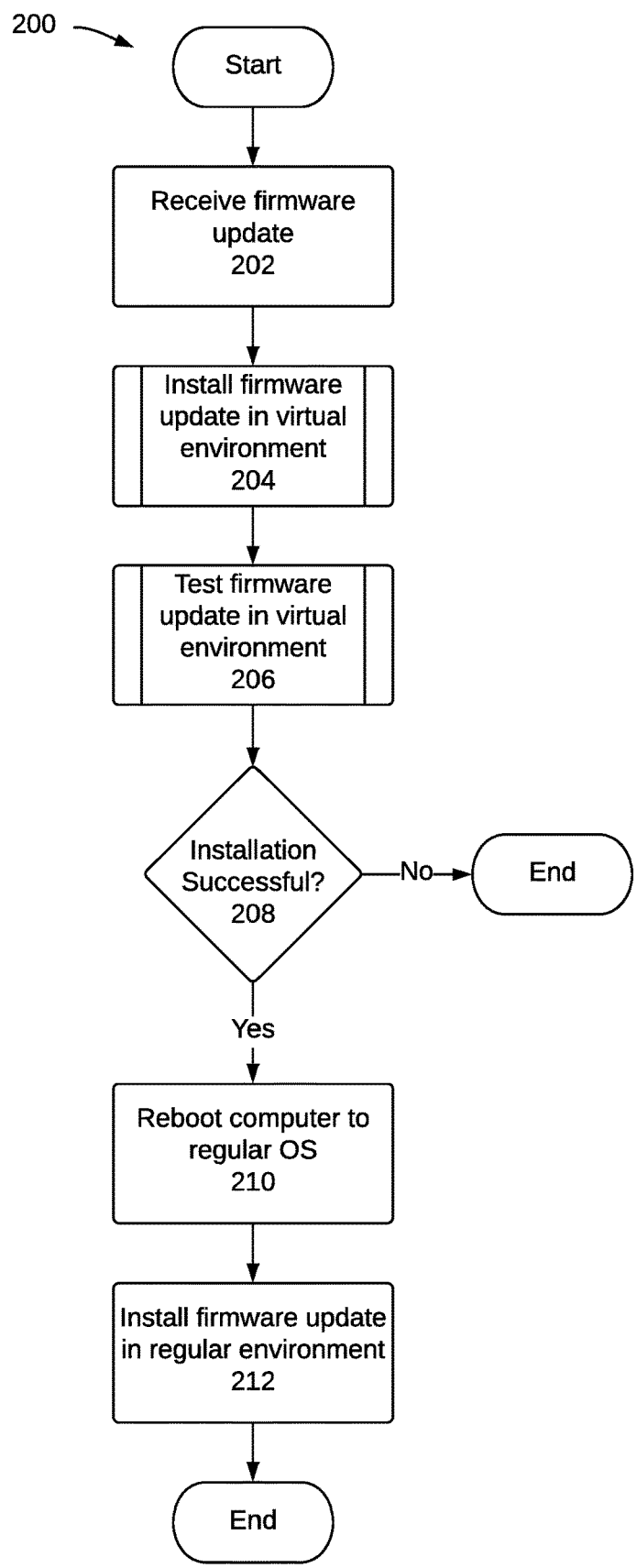
FIG. 2 is a flowchart depicting various actions that can be performed to test and install a firmware update, according to one embodiment of this disclosure.

FIG. 2 is a flowchart of a process 200 illustrating various actions performed in connection with one embodiment of the systems and techniques disclosed herein. As will also be appreciated in light of the present disclosure, this process may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Process 200 is described with reference to elements such as those described in connection with FIG. 1. In one embodiment, process 200 is performed by a UEFI, such as UEFI 124, including components thereof, such as firmware resource monitor 126.

Process 200 begins at 202, where the process receives a firmware update. In one embodiment, the firmware update is a capsule firmware update. In one embodiment, the firmware update is sent by an operating system, such as, e.g., operating system 144. In another embodiment, the firmware update is sent by an application executed by an operating system. In other embodiments, the firmware update can be sent by other sources. In one embodiment, the firmware update is an update to the Basic Input/Output System, more commonly referred to as the BIOS, such as, e.g., BIOS 122. In one embodiment, the firmware update is received by an UEFI, such as UEFI 124. In other embodiments, the firmware update may be received by another component of a computer system, such as, for example, a firmware update for a disk drive, a modem, a wireless card, a network interface controller (NIC), computer graphics cards, routers and other network devices, cellular telephones, smart phones, tablet computers, portable music players, and timing and control systems in various appliances, among various other possibilities.

At 204, process 200 installs the firmware update in a virtual environment. More details related to 204 are provided in FIG. 3 and the accompanying description. In short, however, this step is performed by launching a VMM, such as firmware resource monitor 126, which in turn launches a virtual machine, such as virtual machine 128. The virtual machine is used to install the firmware update in a virtual environment. This functionality allows the firmware update to be installed in a virtual environment that mimics the actual environment. This functionality allows the update to be tested after being installed in the virtual environment without putting the actual environment at risk, such as would be the case, e.g., if the firmware update contains any bugs, errors, viruses, malware, and so forth. Such testing is performed in 206, and will be discussed in more detail below in conjunction with the discussion of FIG. 4 and process 400.

After completing the testing of the firmware update that was installed in 204, process 200 determines whether that installation of the firmware in the virtual environment was successful in 208. The process determines that the installation was successful if no errors or vulnerabilities are detected. While not intended to be limiting in any manner whatsoever, examples of such potential errors and vulnerabilities include model-specific register ("MSR") access violations, I/O access violations, PCI express ("PCIe") access violations, illegal code modification errors, or other such errors as may arise from a faulty firmware update (collectively, "violation(s)"). As will be discussed in more detail below in conjunction with the discussion of FIG. 4 and process 400, the process attempts to resolve any errors that have been detected during the installation of step 204. However, if any unresolved errors remain after 206 is completed, step 208 resolves in the negative, and process 200 ends.

Process 200 may determine at 208 that the installation of step 204 was successful if any unresolved violations remain following 206. If process 200 determines at 208 that the installation of step 204 (i.e., the test installation in the virtual environment) was successful (e.g., no violations or violations were successfully resolved), process 200 proceeds to 210. At 210, process 200 reboots the computer to the regular operating system. The regular operating system may be used (instead of a VMM operating in the UEFI) to perform 212. At 212, having already determined that the firmware update does not contain any unresolved errors or other violations, process 200 uses the regular operating system to install the firmware update. Process 200 may optionally reboot the computer one or more additional times at this time. Once the firmware update has been successfully installed at 212, the computer may resume normal operations that include the use of the firmware update, as necessary.

Figure 3:
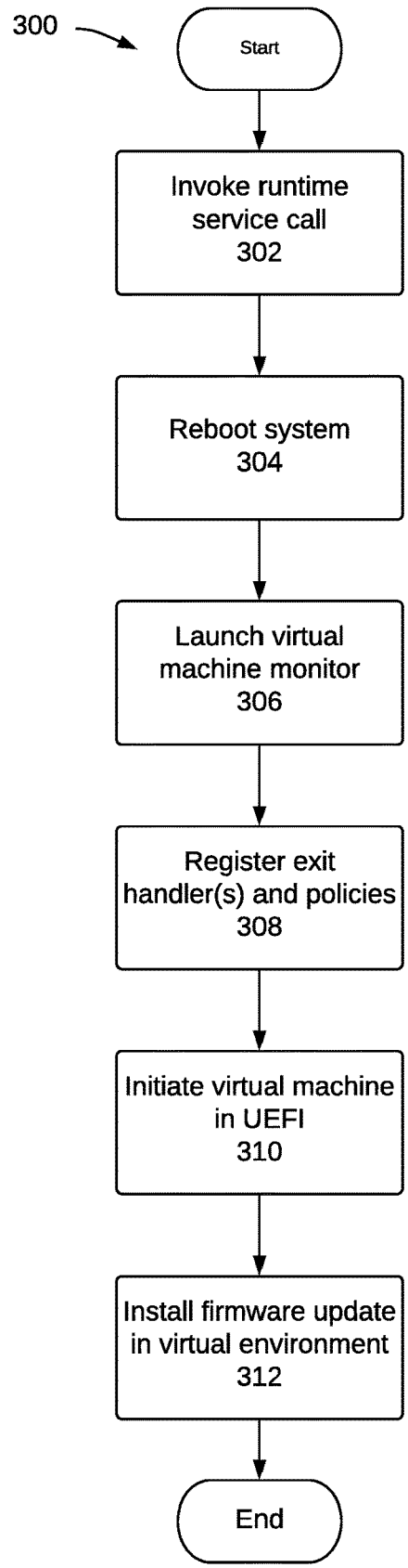
FIG. 3 is a flowchart depicting various actions that can be performed with respect to the installation of a firmware update in a virtual environment, according to one embodiment of this disclosure.

FIG. 3 is a flowchart of a process 300 illustrating various actions performed in connection with one embodiment of the systems and techniques disclosed herein. As will also be appreciated in light of the present disclosure, this process may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Process 300 is described with reference to elements such as those described in connection with FIG. 1. In one embodiment, process 300 is performed by a UEFI, such as UEFI 124, including components thereof, such as firmware resource monitor 126.

As noted above, FIG. 3 and process 300 show additional details of step 204 from FIG. 2 and process 200. As such, process 300 provides additional details related to installing a firmware update in a virtual environment. In some embodiment, process 300 begins at 302, where the process invokes a runtime service call to initiate an update. This functionality is typically performed when the firmware update takes the form of a capsule update, but is not always needed. At 304, process 300 reboots the system. Although the system is generally rebooted prior to performing the remainder of process 300, in certain embodiments the system may not be rebooted. In such embodiments, process 300 may skip 304 and begin at 306. At 306, the UEFI launches a virtual machine monitor (VMM), such as firmware resource monitor 126. Process 300 may also optionally establish a virtual machine control structure (VMCS) either at this stage, at a different point in the execution of process 300, or in some embodiments, not at all.

The VMM (e.g., firmware resource monitor 126) is used in 308 to register and initialize exit handlers and policies related to the virtual machine, such as virtual machine 128. In one embodiment, these exit handlers are initialized and ultimately monitored by a VMM, such as firmware resource monitor 126. By way of example, some of these exit handlers can include an exit handler directed at Central Processing Unit (CPU) Identification (thus, "CPUID"), such as, e.g., VmExitReasonCpuid; one or more exit handlers pertaining to MSR access, such as, e.g., VmExitReasonRdmsr and VmExitReasonWrmsr; one or more exit handlers pertaining to control registers, such as, e.g., VmExitReasonCrAccess; an exit handler related to a timer associated with virtual machine 128, such as, e.g., VmExitReasonVmxPreEmptionTimerExpired; and various other exit handlers, such as, e.g., VmExitReasonEptViolation, VmExitReasonEptMisConfiguration, VmExitReasonIoInstruction, VmExitReasonInit, VmExitReasonSipi, VmExitReasonInvd, VmExitReasonWbinvd, VmExitReasonVmCall, VmExitReasonExternalInterrupt, and VmExitReasonInterruptWindow. While the foregoing exit handlers were provided as examples and to facilitate the discussion herein, many other examples of exit handlers exist and are typically registered at this point as well.

At 310, process 300 initiates a UEFI-based virtual machine, such as virtual machine 128. In various embodiments, the virtual machine can be initiated by either an interface, such as UEFI 124; or by a VMM, such as firmware resource monitor 126; or by a combination of the foregoing components working together. In other embodiments, the virtual machine can be initiated in a different manner. Nevertheless, at this point, process 300 initiates a virtual machine that is not communicatively coupled to (e.g., decoupled from) the regular operating system, thereby preventing any errors or violations in the firmware update from being propagated to the regular operating system or to the actual firmware itself. This UEFI-based virtual machine is typically allocated reserved memory, such that the reserved memory cannot access the memory that is used by the regular operating system. Confining virtual machine 128 in this manner allows for the necessary testing of the firmware update without putting the actual firmware (e.g., the BIOS) or operating system at risk since the UEFI-based virtual machine is communicatively separated from the regular operating system.

In one embodiment, the UEFI-based virtual machine is a "Type 0" virtual machine. As compared to a "Type 1" virtual machine, which typically uses a special purpose operating system, a Type 0 virtual machine may not use a special purpose operating system. A Type 0 virtual machine typically does not include an operating system within the virtual machine. In other embodiments, however, other types of virtual machines, such as a Type 1 virtual machine, can be used.

After the exit handlers have been registered and virtual machine 128 has been initiated, process 300 uses the UEFI-based virtual machine to perform a test installation of the firmware update in a virtual environment, which occurs at 312. This test installation is performed by installing the firmware update in a virtual environment in the UEFI region of memory, such as the virtual environment that was created via previous steps of process 300. By performing a test installation in the UEFI region prior to attempting to install the firmware update with the regular operating system, the system can perform various testing to confirm that the firmware update is valid and without any errors prior to putting the regular operating system and actual firmware at risk during a regular installation. The process can also monitor the various previously-registered exit handlers during this test installation, in order to determine whether any errors or violations were triggered or otherwise caused by the firmware update. These functionalities will be discussed in more detail in conjunction with FIG. 4 and process 400, below.

Figure 4:
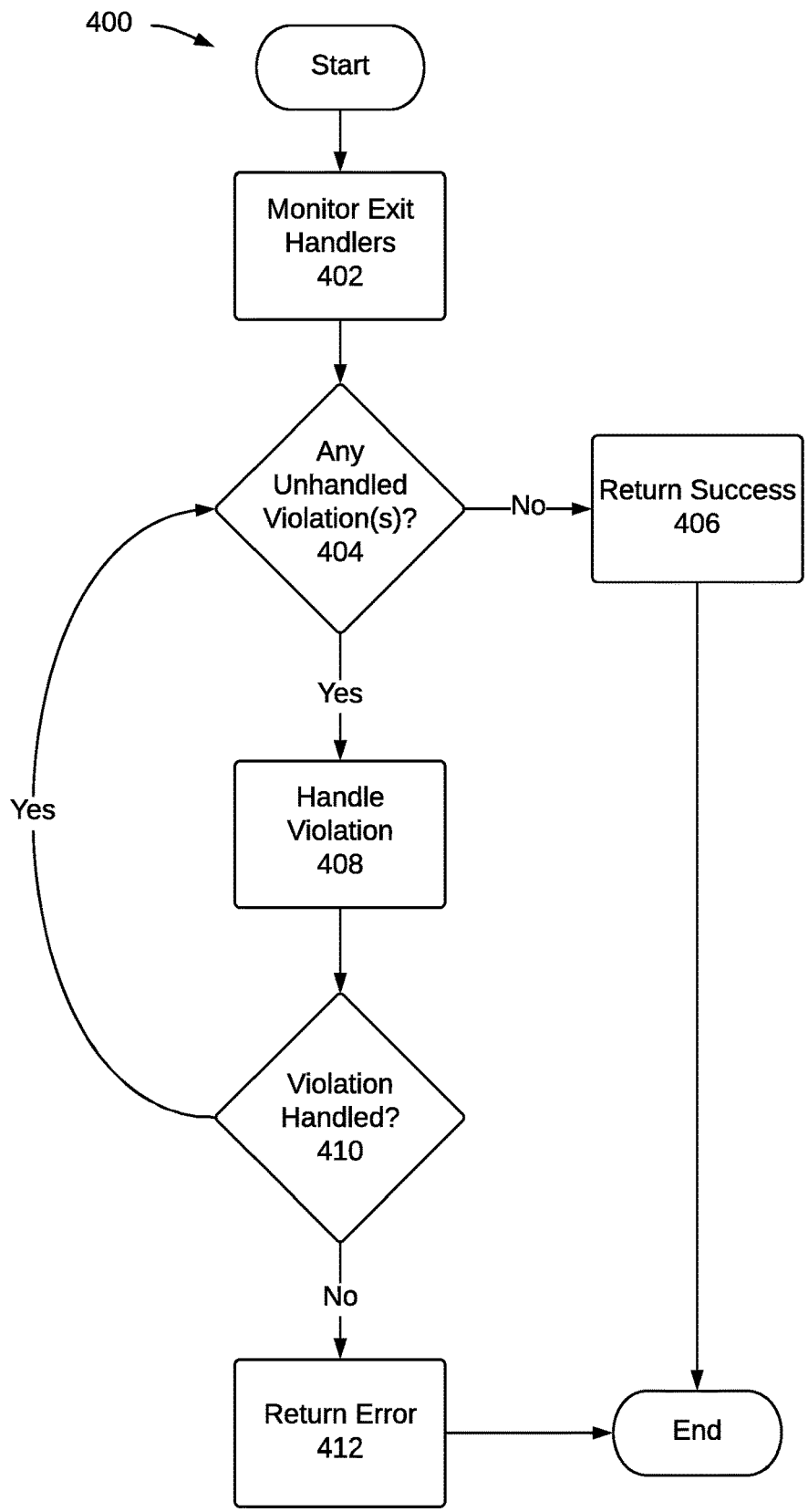
FIG. 4 is a flowchart depicting various actions that can be performed to test a firmware update in a virtual environment, according to one embodiment of this disclosure.

FIG. 4 is a flowchart of a process 400 illustrating various actions performed in connection with one embodiment of the systems and techniques disclosed herein. As will also be appreciated in light of the present disclosure, this process may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Process 400 is described with reference to elements such as those described in connection with FIG. 1. In one embodiment, process 400 is performed by a UEFI, such as UEFI 124.

As noted above, FIG. 4 and process 400 show additional details of step 206 from FIG. 2 and process 200. Process 400 provides additional details related to testing the firmware update that was installed in a virtual environment, such as, e.g., by step 204 and process 300. Process 400 begins at 402, where the process monitors the exit handlers that were previously registered. Although this step is shown as part of a linear flow in FIG. 4, in practice this step can take place throughout the installation and testing processes that are detailed in steps 204 and 206 and processes 300 and 400. For instance, 402 can be performed by one or more threads, daemons, processes, or other such constructs (collectively, "threads") within the virtual machine that are distinct from the one or more threads that perform the other steps described herein.

Step 404 determines whether any unhandled violations are present. As noted above, a violation can be any of various errors and vulnerabilities, such as, e.g., model-specific register ("MSR") access violations, I/O access violations, PCI express ("PCIe") access violations, illegal code modification errors, or other such errors as may arise from a faulty firmware update (collectively, "violation(s)"). Any detected violation may be considered an unhandled violation unless and until that/those violation(s) are properly handled.

In response to determining at 404, that "no", there were not any unhandled violations, the process proceeds to 406 to return a success to process 200. In certain embodiments, this "success" result can take the form of a Boolean value. In other embodiments, a different variable type can be used. In still other embodiments, process 400 may simply "return" to the process that called process 400 without returning any value, or by returning a "void" value. In still other embodiments, the flow can return to process 200 in various other manners.

In response to determining, at 404, that "yes", there was at least one unhandled violation, the process proceeds to 408 where the process attempts to handle at least one of the unhandled violations. In the situation where more than one unhandled violation is detected, process 400 may attempt to resolve more than one of those unhandled violations at substantially the same time. However, for purposes of facilitating the discussion herein, the relevant steps will be discussed with respect to each of the unhandled violations being handled one at a time. (Of course, if only one unhandled violation exists at any time, then that will be the only unhandled violation that needs to be handled at that time.)

Subject to the above discussion, after step 408 attempts to handle an unhandled violations, process 400 proceeds to step 410 and determine if that violation was properly handled. If that violation was properly handled, process 400 returns back to step 404 in order to determine if any other unhandled exceptions remain. Each pass through step 404 is performed in accordance with the description of that step that was provided above. In short, however, if step 404 determines that no further unhandled violations remain at this point, process 400 proceeds to 406 and returns a success, as described in more detail above. Conversely, if step 404 determines that one or more unhandled violations still remain at this point, process 400 proceeds to 408 and continues from that point in accordance with the descriptions of steps 408 and 410 that are provided above.

If, at any point, in any pass through process 400, step 410 determines that a violation was unable to be adequately handled or otherwise resolved, process 400 proceeds to step 412 and returns an error. In certain embodiments, this "error" result can take the form of a Boolean value. In other embodiments, a different variable type can be used. In still other embodiments, process 400 may simply exit and terminate the installation process without "returning" any result at all. Moreover, in various embodiments, process 400 can provide an error message as part of step 412. In various embodiments, such an error message can take the form of an alert. In other embodiments, an error message (and associated information regarding the error) can be provided in other manners. In any event, following either step 406 or 412, process 400 ends. (In practice, process 400 may technically end with the execution of 406 or 412, if the performance of those steps results in transferring control of the operations back to a different process, such as process 200.)

FIG. 5 is a block diagram of a computing system 500 capable of performing one or more of the operations described above. Computing system 500 broadly represents any single or multi-processor computing device or system capable of executing computer-readable instructions. Examples of computing system 500 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 500 may include at least one processor 514 and a memory 516, such as, e.g., reprogrammable read only memory 120. By executing software or other compiled computer code that interfaces with UEFI 124 and invokes firmware resource monitor 126 and virtual machine 128, and/or, or any modifications thereof consistent with this disclosure, computing system 500 becomes a special purpose computing device that is configured to perform operations in the manner described above.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing the operations described herein. Processor 514 may also perform and/or be a means for performing any other operations, methods, or processes described and/or illustrated herein.

Memory 516 generally represents any type or form of volatile or non-volatile storage devices or mediums capable of storing data and/or other computer-readable instructions. Examples include, without limitation, random access memory (RAM), reprogrammable read only memory, electrically erasable programmable read only memory (EE-PROM), other forms of read only memory (ROM), NAND flash memory, other forms of flash memory, a hard disk drive, or any other suitable memory device. Although not required, in certain embodiments computing system 500 may include both a volatile memory unit and a non-volatile storage device. In one example, program instructions implementing on or more operations described herein may be loaded into memory 510. As shown in FIG. 5, memory 516 also includes UEFI 124.

In certain embodiments, computing system 500 may also include one or more components or elements in addition to processor 514 and memory 516. For example, as illustrated in FIG. 5, computing system 500 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 500. For example, in certain embodiments memory controller 518 may control communication between processor 514, memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 500, such as processor 514, memory 516, communication interface 522, display adapter 526, input interface 530, and storage interface 534.

Communication interface 522 broadly represents any type or form of communication device or adapter capable of facilitating communication between computing system 500 and one or more additional devices. For example, in certain embodiments communication interface 522 may facilitate communication between computing system 500 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1894 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 500 to engage in distributed or remote computing. For example, communication interface 522 may receive instructions from a remote device or send instructions to a remote device for execution.

As illustrated in FIG. 5, computing system 500 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer) for display on display device 524.

As illustrated in FIG. 5, computing system 500 may also include at least one input device 528 coupled to communication infrastructure 512 via an input interface 530. Input device 528 generally represents any type or form of input device capable of providing input, either computer or human generated, to computing system 500. Examples of input device 528 include, without limitation, a keyboard, a pointing device, a speech recognition device, or any other input device.

As illustrated in FIG. 5, computing system 500 may also include a storage device 532 coupled to communication infrastructure 512 via a storage interface 534. Storage device 532 generally represents any type or form of storage device or medium capable of storing data and/or other computer-readable instructions. For example, storage device 532 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage device 532 and other components of computing system 500. A storage device like storage device 532 can store information such as the data structures described herein, as well as one or more computer-readable programming instructions that are capable of causing a computer system to execute one or more of the operations described herein.

In certain embodiments, storage device 532 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 532 may also include other similar structures or devices for allowing computer software, data, or other computer-readable instructions to be loaded into computing system 500. For example, storage device 532 may be configured to read and write software, data, or other computer-readable information. Storage devices 532 may also be a part of computing system 900 or may be a separate device accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from that shown in FIG. 5.

Computing system 500 may also employ any number of software, firmware, and/or hardware configurations. For example, one or more of the embodiments disclosed herein may be encoded as a computer program (also referred to as computer software, software applications, computer-readable instructions, or computer control logic) on a non-transient computer-readable storage medium. Examples of non-transient computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The non-transient computer-readable storage medium containing the computer programming instructions may be loaded into computing system 500. All or a portion of the computer programming instructions stored on the non-transient computer-readable storage medium may be stored in memory 516 and/or various portions of storage device 532. When executed by processor 514, a computer program loaded into computing system 500 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 500 may be configured as an application specific integrated circuit (ASIC) adapted to implement one or more of the embodiments disclosed herein.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a firmware update by a computer;
booting into a basic input output system (BIOS) of the computer that includes a unified extensible firmware interface (UEFI);
initiating a virtual machine in the UEFI;
allocating reserved memory for the virtual machine, wherein the reserved memory cannot access memory used by an operating system of the computer;

installing the firmware update in the virtual machine in the UEFI, wherein the virtual machine is decoupled from the operating system of the computer;
determining that the firmware update installed error-free in the virtual machine in the UEFI; and
based on determining that the firmware update installed error-free:
  performing a reboot of the computer including initiating execution of the operating system of the computer; and
  installing, by the operating system, the firmware update in the computer.

2. The method of claim 1, further comprising:
prior to initiating the virtual machine, registering one or more event handler policies.

3. The method of claim 1, determining that the firmware update installed error-free in the virtual machine comprises:
determining that installing the firmware update in the virtual machine caused no access violations in the reserved memory.

4. The method of claim 1, further comprising:
receiving, by the computer, a second firmware update;
registering one or more event handlers;
initiating the virtual machine in the UEFI;
installing the second firmware update in the virtual machine in the UEFI;
determining that an access violation occurred in the reserved memory as a result of installing the second firmware update in the virtual machine environment; and
invoking an event handler of the one or more event handlers, wherein the event handler is associated with the access violation.

5. The method of claim 4, further comprising:
receiving an error from the event handler;
determining, based on the error, that the error cannot be resolved by the event handler;
displaying an error message associated with the error; and
not installing the second firmware update in the computer.

6. The method of claim 1, wherein the firmware update comprises an updated BIOS to replace the BIOS.

7. The method of claim 1, wherein determining that the firmware update installed error-free in the virtual machine comprises:
determining that the firmware update installed in the virtual machine did not attempt to access one or more prohibited memory locations of the reserved memory.

8. A computer comprising:
a basic input output system (BIOS) comprising a unified extensible firmware interface (UEFI);
a microprocessor; and
a non-transient computer-readable storage medium, comprising computer instructions executable by the microprocessor, wherein the computer instructions are configured to perform operations comprising:
  receiving a firmware update;
  booting into the BIOS;
  initiating a virtual machine in the UEFI, wherein the virtual machine is decoupled from an operating system of the computer;
  allocating reserved memory for the virtual machine, wherein the reserved memory cannot access memory used by an operating system of the computer;
  installing the firmware update in the virtual machine in the UEFI;
  determining that the firmware update installed error-free in the virtual machine in the UEFI; and
  based on determining that the firmware update installed error-free:
    performing a reboot of the computer including initiating execution of the operating system of the computer; and
    installing, by the operating system, the firmware update in the computer.

9. The computer of claim 8, the operations further comprising:
prior to initiating the virtual machine, registering one or more event handler policies.

10. The computer of claim 8, the operations further comprising:
installing a second firmware update in the virtual machine in the UEFI;
determining that the second firmware update attempted to access one or more prohibited memory locations in the reserved memory; and
not installing the second firmware update in the computer.

11. The computer of claim 8, the operations further comprising:
receiving a second firmware update;
registering one or more event handlers;
initiating the virtual machine in the UEFI;
installing the second firmware update in the virtual machine in the UEFI;
determining that an access violation occurred in the virtual machine after installing the second firmware update; and
invoking an event handler of the one or more event handlers, wherein the event handler is associated with the access violation.

12. The computer of claim 11, the operations further comprising:
receiving an error from the event handler;
determining, based on the error, that the access violation in the virtual machine cannot be resolved by the event handler;
displaying an error message associated with the error; and
not installing the second firmware update in the computer.

13. The computer of claim 8, wherein the firmware update comprises an update to at least one of:
the BIOS;
a disk drive firmware of the computer;
a modem firmware of the computer;
a wireless communications card firmware of the computer;
a network interface controller (NIC) firmware of the computer; or
a computer graphics card firmware of the computer.

14. The computer of claim 8, wherein determining that the firmware update installed error-free in the virtual machine comprises:
determining that the firmware update installed in the virtual machine in the UEFI did not attempt to access one or more prohibited memory of the reserved memory.

15. A computer program product, comprising a plurality of instructions stored on a non-transient computer-readable storage medium, wherein the instructions are executable by one or more processors of a computer to perform operations comprising:
receiving a firmware update;
booting into a basic input output system (BIOS) of the computer that includes a unified extensible firmware interface (UEFI);
initiating a virtual machine in the UEFI;

allocating reserved memory for the virtual machine, wherein the reserved memory cannot access memory used by an operating system of the computer;

installing the firmware update in the virtual machine in the UEFI;

determining that the firmware update installed error-free in the virtual machine in the UEFI, wherein the virtual machine is decoupled from an operating system of the computer; and based on determining that the firmware update installed error-free:

performing a reboot of the computer including initiating execution of the operating system of the computer; and installing, by the operating system, the firmware update in the computer.

16. The computer program product of claim 15, the operations further comprising:

prior to initiating the virtual machine, registering one or more event handler policies.

17. The computer program product of claim 15, wherein installing a second firmware update in the virtual machine in the UEFI;

determining that the second firmware update installed in the virtual machine in the UEFI attempted to access one or more prohibited memory locations in the reserved memory; and exiting a firmware installation process without installing the second firmware update in the computer.

18. The computer program product of claim 15, the operations further comprising:

receiving a second firmware update;

registering one or more event handlers;

initiating the virtual machine in the UEFI;

installing the second firmware update in the virtual machine in the UEFI;

determining that an access violation occurred in the virtual machine as a result of installing the second firmware update in the virtual machine; and invoking an event handler of the one or more event handlers wherein the event handler is associated with the access violation.

19. The computer program product of claim 18, the operations further comprising:

receiving an error from the event handler;

determining, based on the error, that the error cannot be resolved by the event handler;

displaying an error message associated with the error; and not installing the second firmware update in the computer.

20. The computer program product of claim 15, wherein the firmware update comprises an update to at least one of:

the BIOS;

a disk drive firmware of the computer;

a modem firmware of the computer;

a wireless communications card firmware of the computer;

a network interface controller (NIC) firmware of the computer; or a computer graphics card firmware of the computer.

* * * * *